(12) United States Patent
Jansson et al.

(10) Patent No.: US 11,329,483 B2
(45) Date of Patent: May 10, 2022

(54) SYSTEM AND A METHOD FOR FEEDING ELECTRIC POWER TO A CONSUMER THEREOF

(71) Applicant: BOMBARDIER TRANSPORTATION GMBH, Berlin (DE)

(72) Inventors: Magnus Jansson, Kvicksund (SE); Henrik Mosskull, Västerås (SE); Peter Krafka, Schriesheim (DE); Daniel Wagner, Ilvesheim (DE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 16/979,944

(22) PCT Filed: Mar. 13, 2019

(86) PCT No.: PCT/EP2019/056254
§ 371 (c)(1),
(2) Date: Sep. 11, 2020

(87) PCT Pub. No.: WO2019/179846
PCT Pub. Date: Sep. 26, 2019

(65) Prior Publication Data
US 2021/0021124 A1  Jan. 21, 2021

(30) Foreign Application Priority Data
Mar. 20, 2018 (SE) .................... 1850310-2

(51) Int. Cl.
*H02J 1/02* (2006.01)
*B60L 9/18* (2006.01)
(Continued)

(52) U.S. Cl.
CPC .................. *H02J 1/02* (2013.01); *B60L 7/22* (2013.01); *B60L 9/18* (2013.01); *H02M 7/48* (2013.01)

(58) Field of Classification Search
CPC ..... H02J 1/02; B60L 7/22; B60L 9/18; H02M 7/48
(Continued)

(56) References Cited

U.S. PATENT DOCUMENTS

| 5,012,400 A | 4/1991 | Yasuda |
| 6,556,460 B2 * | 4/2003 | Ishida ................ H02M 1/143 |
| | | 180/65.1 |

(Continued)

FOREIGN PATENT DOCUMENTS

| EP | 2472710 A1 | 7/2012 |
| EP | 3142241 A1 | 3/2017 |
| JP | S62-250893 A | 10/1987 |

OTHER PUBLICATIONS

Maheshwari et al, "An Active Damping Technique for Small DC-Link Capacitor Based Drive System," IEEE Transactions on Industrial Informatics, vol. 9, No. 2, May 2013, pp. 848-858.

*Primary Examiner* — Hal Kaplan
(74) *Attorney, Agent, or Firm* — Dilworth & Barrese, LLP

(57) ABSTRACT

A system for feeding electric power to a first consumer (1) comprises an input filter (6) with an input configured to be connected to a DC energy source and a DC intermediate link (3) connected to an output (14) of the input filter. A converter (12) is with an input connected to the DC intermediate link and has an output to be connected to said first consumer (1). The unit (16) controls the converter to obtain feeding of electric power requested by the first consumer independently of variations of the voltage on the DC link (3). An assembly is configured to act stabilizing on that voltage by controlling the converter to add a first power component to the power to be fed to the consumer. A second consumer (19) is controlled (Continued)

to consume a second power component to either assist the control of the converter to obtain the stabilization or alone take care thereof.

19 Claims, 5 Drawing Sheets

(51) Int. Cl.
*H02M 7/48* (2007.01)
*B60L 7/22* (2006.01)

(58) Field of Classification Search
USPC .................................................. 307/9.1, 10.1
See application file for complete search history.

(56) References Cited

U.S. PATENT DOCUMENTS

| | | | |
|---|---|---|---|
| 6,642,689 B2* | 11/2003 | Ishida | ............... H02M 7/53803 318/807 |
| 2002/0141212 A1 | 10/2002 | Ishida et al. | |
| 2003/0043605 A1 | 3/2003 | Ishida et al. | |

\* cited by examiner

SYSTEM AND A METHOD FOR FEEDING ELECTRIC POWER TO A CONSUMER THEREOF

TECHNICAL FIELD OF THE INVENTION

The present invention relates to a system for feeding electric power, which system comprises an input filter with an input configured to be connected to a DC energy source, a DC intermediate link connected to an output of the input filter, a converter with an input connected to the DC intermediate link and an output configured to be connected to a said first consumer of electric power, a unit configured to control the converter to obtain feeding of electric power requested by a said first consumer independently of variations of the voltage on the DC intermediate link, and an assembly configured to act stabilizing on the voltage on the DC intermediate link upon a variation of this voltage, as well as a method for feeding electric power according to the preamble of the appended independent method claim.

The first consumer of electric power may be any consumer of electric power, such as an electric machine and in the case of a said system on board a track-bound vehicle for the propulsion of the vehicle or in an auxiliary power system providing electric power to a distribution network to sockets, lighting, heating, and other appliances on board the vehicle. The DC intermediate link may be connected to a DC energy source in the form of electric batteries or a DC-supply line, such as for feeding electric power to track-bound vehicles. The converter may be of any type, such as a DC/AC or DC/DC converter, controlled by a said unit to switch, such as by Pulse With Modulation (PWM), for converting the power to be fed to said first consumer.

A said input filter is arranged to smooth the current drawn from the DC energy source through the DC intermediate link. To allow good suppression of high frequency switching harmonics through cost and energy efficient filters these filters typically become poorly damped. When the converter, as here, shows a constant power load (CPL) behavior, which means that the power consumed by a said first consumer is approximately independent of the voltage on the DC intermediate link, a decrease/increase of the DC intermediate link voltage requires an increase/decrease of consumed current to keep the power consumption unaffected. In connection with a poorly damped input filter, such behavior is likely to result in system instability, leading to system shutdown due to under- or overvoltage trips. This is the reason for providing such a system with an assembly configured to act stabilizing on the voltage on the DC intermediate link upon a variation of this voltage. However, the objective of the stabilization is not only to stabilize the system but also to obtain a desired damping for avoiding occurrence of over and under voltage trips.

BACKGROUND ART

It may be attempted to solve the problem of obtaining said stabilization by adding passive damping components, such as additional or larger filters, but that would result in the drawback of adding complexity, cost, weight, space, and total power losses of the system. This is the reason for attempting to obtain said stabilization in the form of so called active stabilization instead by controlling the converter to add a first power component to the power to be fed to a said first consumer to obtain stabilization of the DC link voltage upon occurrence of a variation of this voltage. Such a stabilization action does not involve the drawbacks mentioned of adding passive components in the form of filters. However, also this way of obtaining said stabilization has drawbacks, since internal high-priority power-control objectives of the power load may interfere with the power modifications generated for stabilization. In such cases, neither system stability nor fulfillment of the internal control objectives may be assured. Internal control objectives include protection functions like current-, torque-, and power limitations, but also performance objectives requiring large control bandwidth. One example is traction control of electrical vehicles, where fast power control may be required to maximize adhesion during slippery road or track conditions. Limitations of active stabilization may also be caused by physical limitations of power control, such as blocked converters. The application of the present invention on systems in track-bound vehicles is mainly discussed in this disclosure so as to illuminate the invention and the problems to be solved thereby without for that sake restricting the invention to that application.

SUMMARY OF THE INVENTION

The object of the present invention is to provide a system of the type defined in the introduction being improved with respect to such systems already known by addressing the problems thereof discussed above.

This object is according to the invention obtained by providing such a system with the features listed herein.

By an arrangement configured to sense at least one parameter associated with the system indicating whether the control unit is able to obtain said stabilization by adding a said first power component, it may be detected if any of the above situations where the modification of the control of the converter for obtaining said stabilization has drawbacks occur and another stabilization procedure would be preferred. In such a case a said second consumer of electric power connected in parallel with the converter to the output of the input filter may be controlled to consume a second power component to one of a) assist the control of the converter to obtain said stabilization and b) alone take care of this stabilization when the assembly is unable to obtain this alone by adding a said first power component at the control of the converter. The shortcomings of the stabilization by using the control of the converter mentioned above may then be addressed by instead using the control of said second consumer to consume a said second power component. However, it is pointed out that stabilization by controlling the converter will be used alone when this is possible, since such a control will result in a minimum or no additional power losses, but as soon as this converter control is not able to obtain said stabilization alone, i.e. in a favourable way, the stabilization aimed at may be obtained by using the option of controlling said second consumer to consume a second power component.

According to an embodiment of the invention said second power consumer comprises a series connection of a resistance and a semiconductor switch connected to the DC intermediate link between the input filter and the converter, and said control member of the system is configured to control said second consumer to consume a said second power component by controlling the semiconductor switch so as to consume electric power by a current then flowing through the resistance, which is preferably realized by a resistor. Thus, a said second power component for obtaining said stabilization of the DC intermediate link voltage may then be consumed by heat generated in the resistance by the current flowing therethrough. Such a second consumer of electric power is in the case of a said system on board a track-bound vehicle already there and has not to be added, since it is there for acting as a so called brake chopper. Such a chopper enables controlled deenergizing of the energy stored in the DC intermediate link, such as in said input filter, allow protection at large DC intermediate link voltages and can be used to consume electric power in case of braking of the vehicle without any possibility to feed back power generated in said first consumer in the form of an electric machine to the DC-supply line. The latter possible use is the reason for calling such a consumer a brake chopper.

According to another embodiment of the invention said arrangement is configured to sense the electric current flowing through said converter, and said control member of the system is configured to control said second consumer to consume a said second power component to obtain said stabilization when the current sensed exceeds a predetermined value making a stabilization by adding a said first power component resulting in a possible exceeding of a minimal margin remaining to a maximum current allowed for the converter. This means that no additional current margins, and by that no overdimensioning of the system is required for obtaining the stabilization aimed at when the current is close to the maximum current allowed for the converter, since it will then be shifted to obtain said stabilization through the control of the second consumer instead.

According to another embodiment of the invention said arrangement is configured to sense whether said converter is blocked or not, and said control member of the system is configured to control said second consumer to consume a second power component for obtaining said stabilization when the converter is blocked. Thus, damping of the system with blocked converter may be improved for obtaining said stabilization by controlling said second consumer.

According to another embodiment of the invention the system is configured to feed electric power to a first consumer in the form of an electric machine.

According to another embodiment of the invention said arrangement is configured to sense the torque generated by the electric machine, and said control member of the system is configured to control said second consumer to consume a said second power component to obtain said stabilization when the torque sensed exceeds a predetermined value making a stabilization by adding a said first component to resulting in a possible exceeding of a minimal margin remaining to a maximum torque allowed for the electric machine.

According to another embodiment of the invention such a system on board a track-bound vehicle is configured to sense the rotation speed of the electric machine, and said control member of the system is configured to control said second consumer to consume a said second power component for obtaining said stabilization when the speed sensed is below a predetermined value. This means that limited power modification possibilities of the motor (electric machine) at low speeds of the electric machine can be compensated by using said second power consumer, such as a brake chopper, to improve damping of the system.

According to another embodiment of the invention the system is configured to feed electric power to a first consumer on board a track-bound vehicle, such as for propulsion of the vehicle or in an auxiliary power system of the vehicle.

According to another embodiment of the invention the system is configured to feed electric power to an electric machine on board a track-bound vehicle for propulsion of the vehicle, said arrangement is configured to sense a parameter indicating the slippery degree of tracks upon which a said vehicle is moving, and said control member of the system is configured to control said second consumer to consume a second power component to obtain said stabilization when slippery tracks demanding a slip slide control of the vehicle are sensed. This means that the stabilization control, which is carried out by the use of said second consumer, such as a brake chopper, will not interfere with the torque regulation (slip slide control) necessary for obtaining efficient influence of the electric machine upon the wheels of the vehicle in slippery conditions.

According to another embodiment of the invention said second consumer is a so called brake chopper controllable to consume electric power upon braking of the vehicle without possibility to feed electric power back to said DC energy source. It is preferred to use such a brake chopper as said second consumer, since it is in any case already there in a track-bound vehicle not adding any extra costs.

The invention also relates to a method for feeding electric power according to the appended independent method claim. The features and advantages of such a method and the embodiments thereof defined in dependent claims appear clearly from the above discussion of the system according to the invention.

The invention also relates to a driving arrangement for a track-bound vehicle as well as a track-bound vehicle according to the appended claims for such an arrangement and vehicle.

Further advantages as well as advantageous features of the invention will appear from the description following below.

BRIEF DESCRIPTION OF THE DRAWINGS

With reference to the appended drawings, below follows a specific description of an embodiment of the invention cited as an example.

In the drawings.

DETAILED DESCRIPTION OF AN EMBODIMENT OF THE INVENTION

Figure 1:
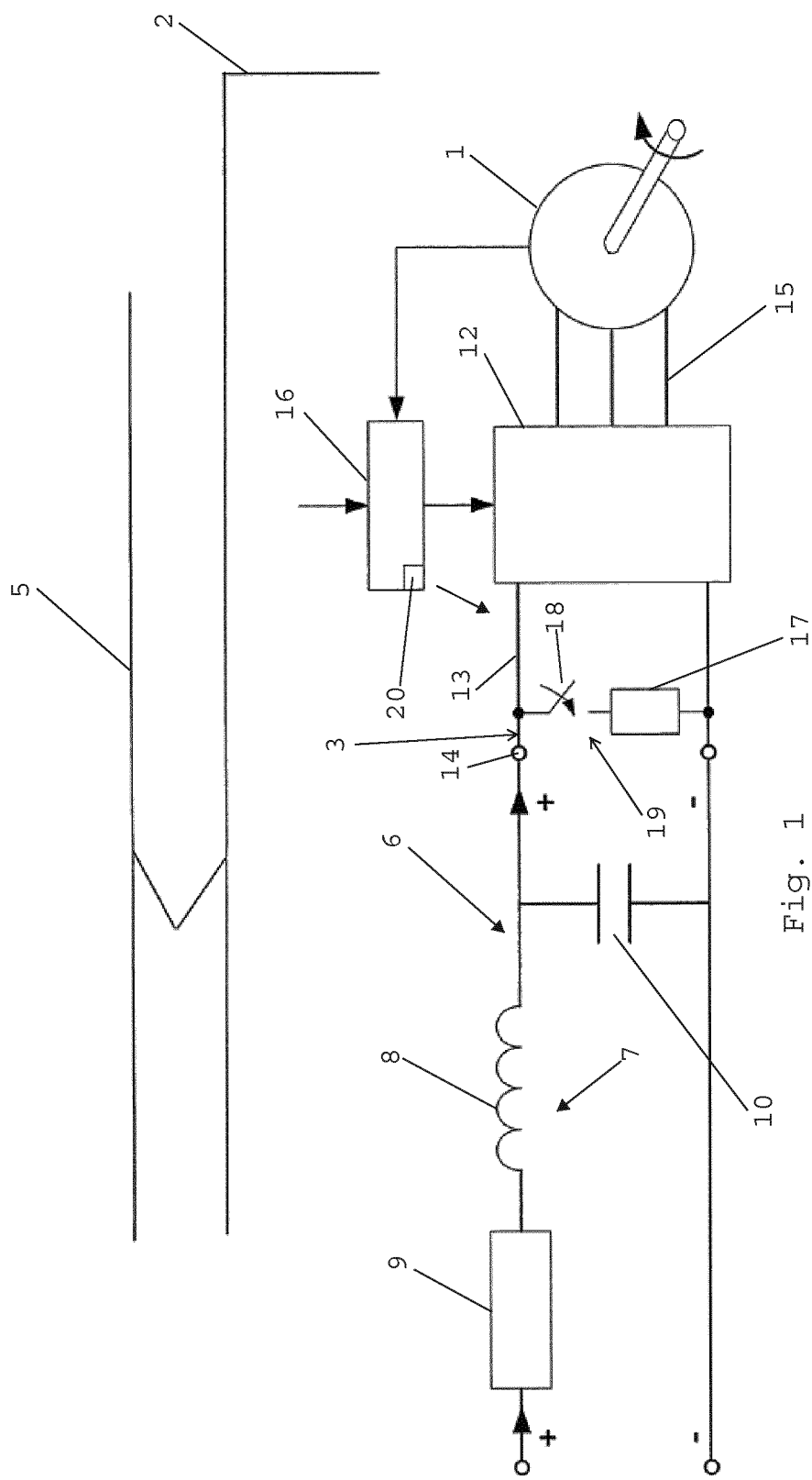
FIG. 1 illustrates very schematically a system for feeding electric power to an electric machine on a track-bound vehicle according to an embodiment of the invention.

The general construction of a system for feeding electric power to a first consumer of electric power in the form of an electric machine 1 on board a track-bound vehicle 2 for propulsion of the vehicle is schematically illustrated in FIG. 1. The system has an input filter 6 with an input configured to be connected to a DC energy source in the form of a DC supply line 5. The input filter is in the form of an LC filter 6, with an inductor 7 having an inductance 8 and a resistance 9 and a capacitor 10. A DC intermediate link 3 is connected to an output 14 of the input filter. A converter 12, here a voltage source inverter, has an input 13 connected to the DC intermediate link 3 and an output 15 through which the converter delivers AC electric power to the electric machine 1. A control unit 16 is configured to control the converter by using Pulse Width Modulation to feed the AC electric power to the electric machine. The switching of the power semiconductor devices, such as IGBTs, of the converter will cause harmonics on the input side of the converter suppressed by said filter 6. The control unit is configured to obtain feeding of electric power requested by the electric machine independently of variations of the voltage on the DC intermediate link. A second consumer of electric power in the form of a resistor 17 is connected in series with a semiconductor switch 18, such as an IGBT, in parallel with the capacitor 10 of the LC filter 6 to the output 14 of the filter. This constitutes a so-called brake chopper 19, through which power generated when braking the vehicle by the electric machine 1 then functioning as a generator can be consumed when there is no possibility to feed the power generated back to the DC-supply line 5. A control member 20 of the system is configured to control the semiconductor switch 18 and by that said second consumer to consume electric power through current flowing through and heating the resistor 17. This control member 20 may be integrated in the control unit 16 as indicated in FIG. 1 or be formed by a separate unit.

Figure 2:
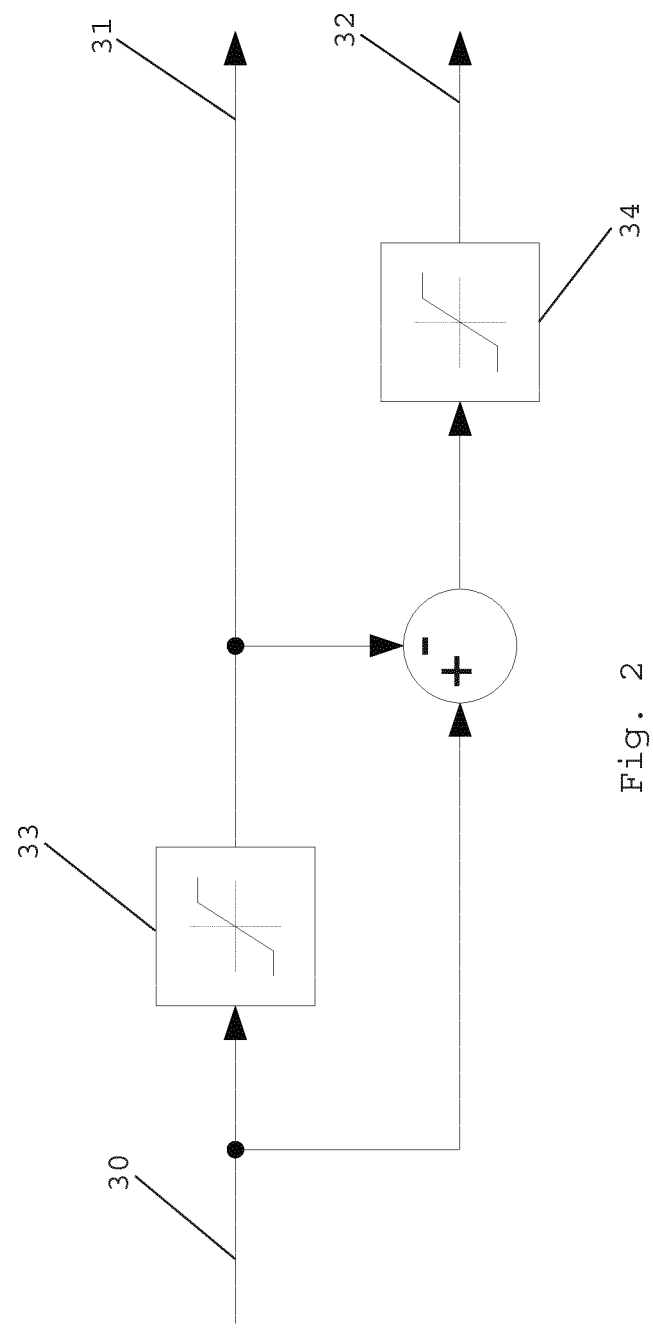
FIG. 2 illustrates the principal upon which the present invention is based.

The system has an assembly configured to act stabilizing on the voltage of the DC intermediate link upon a variation of this voltage. If, for instance, said voltage suddenly decreases that would in the case of controlling the converter to feed a constant power to the electric machine result in a sudden increase of the current to keep the power unaffected, which would lower the voltage further, and accordingly result in an instability of the DC intermediate link voltage. However, this behavior may be counteracted by then making the control unit 16 to control the converter 12 to add a first power component to the power to be fed to the electric machine, so that there will be no decrease of the current to the electric machine but a slightly short time increase of the power fed thereto. This means that efficient stabilization of the DC link voltage upon occurrence of a variation of this voltage is obtained without causing any additional power losses. However, in some situations it is not possible to efficiently carry out such a stabilization procedure. In such a case the control member 20 may instead control the brake chopper 19 to consume a second power component for obtaining said stabilization of the DC intermediate link voltage upon occurrence of a variation of this voltage. The system comprises an arrangement configured to sense at least one parameter associated with the system indicating whether the control unit is able to obtain said stabilization by adding a said first component to the control of the converter. The control unit may then decide how the two possible stabilization procedures shall be combined. This is schematically illustrated in FIG. 2 showing 30 as the total power modification for stabilization in the form of the power component to be added to the power consumed by the electric machine for obtaining stabilization. This may be done by a first power component 31 to be consumed by the electric machine and/or a second power component 32 consumed by the brake chopper (second consumer). The upper and lower limits of a limitation block 33 are dynamically varied with the operating point of the system to realize required stabilization performance with minimal use of the brake chopper to minimize power losses. A limitation block 34 in the form of a block for "lower limitation to zero" is inserted, since the power reference to the brake chopper would be positive if negative deviations cannot be realized by the brake chopper. However, the brake chopper control may be provided with an offset enabling a dynamic reduction of the power consumption of the chopper and thus obtaining of such negative deviations.

Figure 3:
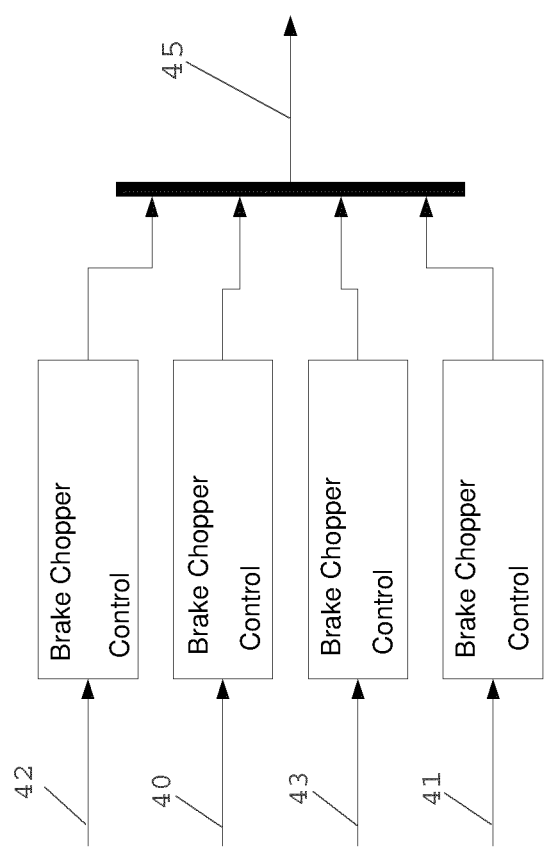
FIG. 3 illustrates the voltage stabilizing function of a said assembly in a system according to an embodiment of the invention by changing the proportions of said first and second power components.

The system comprises an arrangement configured to sense at least one parameter associated with the system indicating whether the control unit 16 is able to obtain said stabilization by adding a said first component, and this arrangement is through an arrow indicated by 40 in FIG. 3 configured to sense the electric current flowing through the converter 12. The control member 20 is configured to control the second consumer, here the brake chopper 19, to consume a said second power component to obtain said stabilization when the current sensed exceeds a predetermined value making a stabilization by adding a said first component resulting in a possible exceeding of a minimal margin remaining to a maximum current allowed for the converter. This means that the system has not to be overdimensioned to be able to obtain said stabilization by adding said first power components when controlling the converter which would require additional current margins for proper operation.

It is through an arrow 41 in FIG. 3 indicated that the arrangement is further configured to sense whether said converter 12 is blocked or not, and the control member 20 of the system is configured to control said second consumer, here the brake chopper 19, to consume a second power component for obtaining said stabilization when the converter is blocked, which results in an improved damping of the system.

It is by an arrow 42 in FIG. 3 indicated that the arrangement is further configured to sense the speed of the vehicle, and the control member 20 of the system is configured to control said second consumer, here the brake chopper 19, to consume a said second power component for obtaining said stabilization when the speed sensed is below a predetermined value. As mentioned before, limited power modification possibilities of the motor (electric machine 1) at low speeds can by this be compensated by using said second consumer to improve system damping.

It is through an arrow 43 in FIG. 3, indicated how the arrangement is further configured to sense a parameter indicating the slippery degree of tracks upon which the vehicle is moving, and the control member 20 of the system is configured to control said second consumer, here the brake chopper 19, to consume a second power component to obtain said stabilization when slippery tracks demanding a slip slide control of the vehicle are sensed. This means that the stabilization action is decoupled from the control of the power to the motor, so that this may be directed solely to meet the requirements of the slip slide control. 45 indicates the actual control to be carried out for obtaining said stabilization considering 40-43.

Figure 4A:
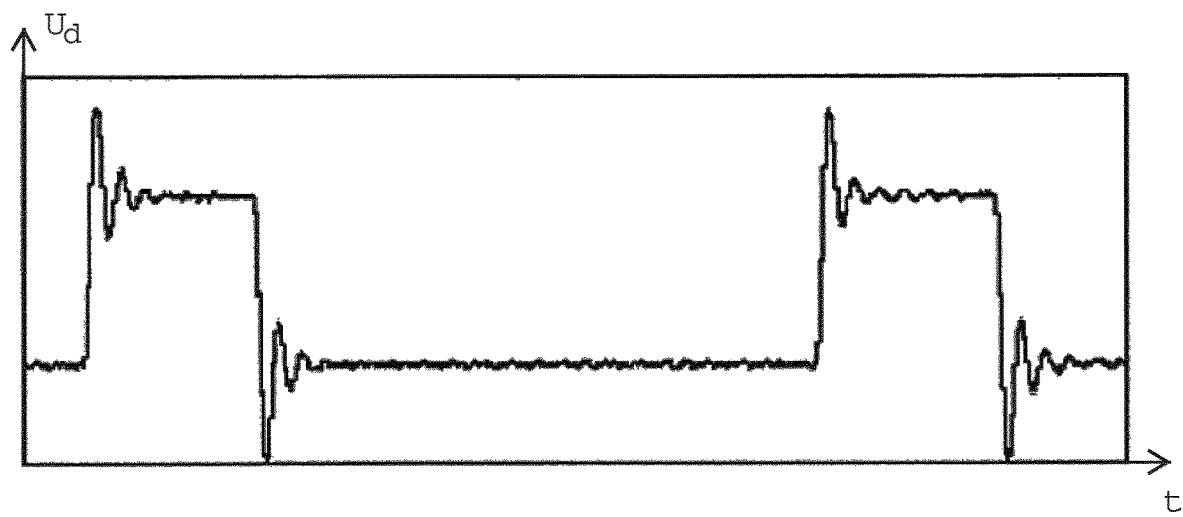
FIG. 4*a-d* are graphs showing simulation results of a stabilization action carried out upon a variation of the DC intermediate link voltage in a system according to the invention.
Figure 4B:
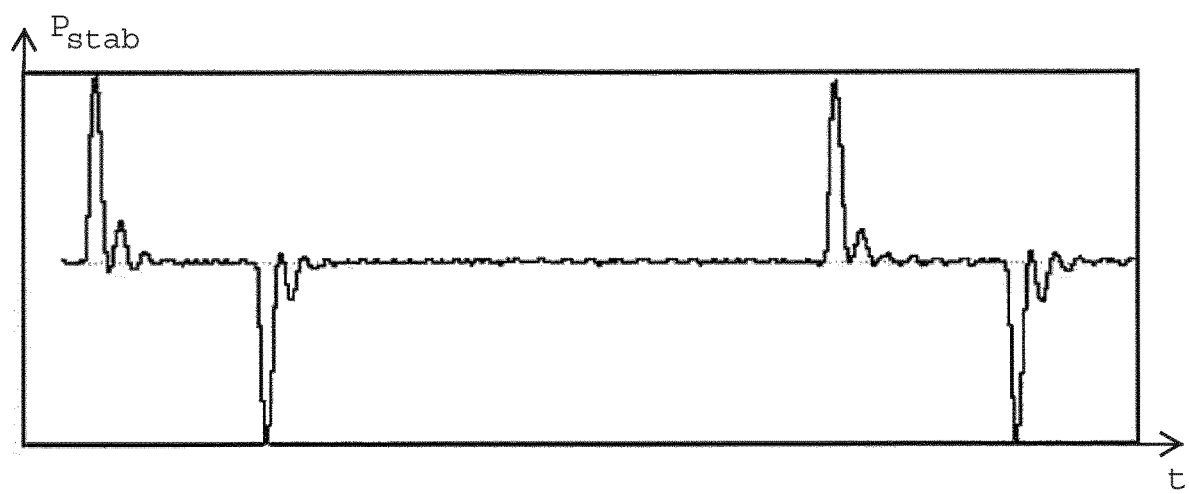
Figure 4C:
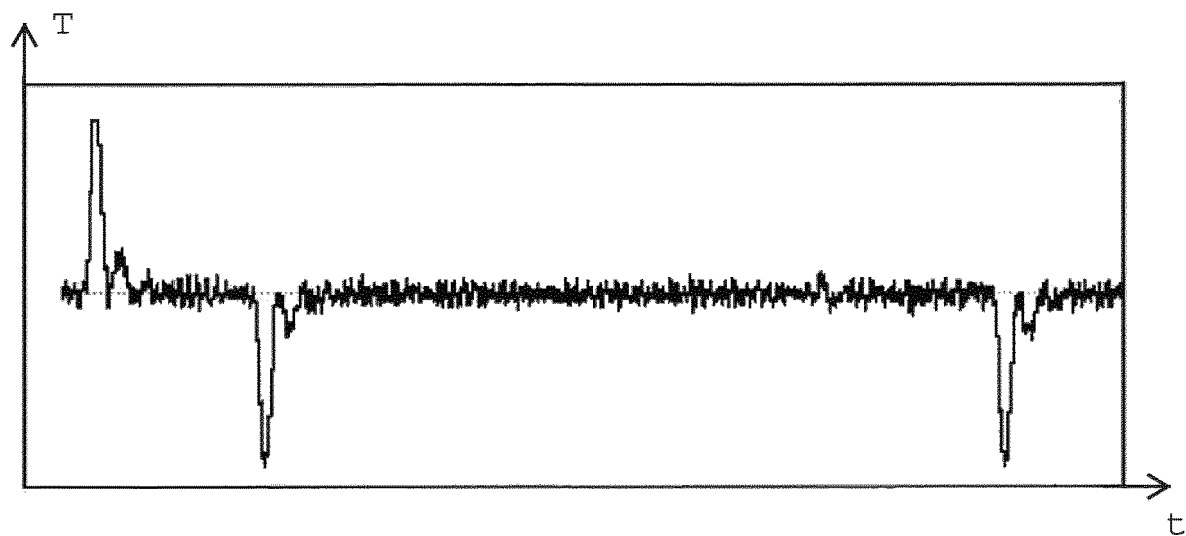
Figure 4D:
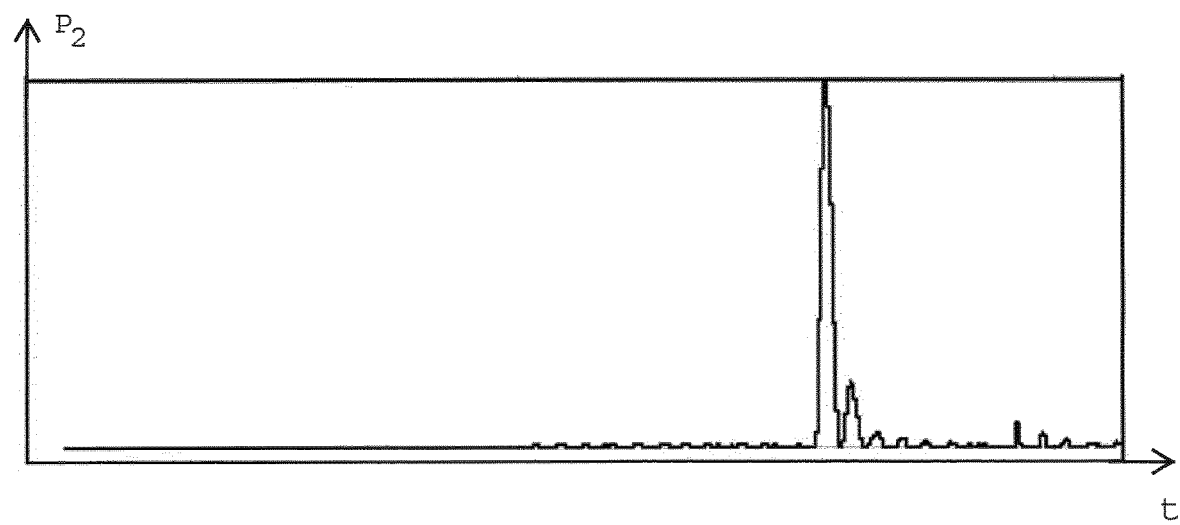

FIG. 4*a-d* are graphs illustrating how a desired power modification for obtaining a said stabilization may be obtained by combining the control of the converter (power motor control) and the control of the brake chopper (second consumer). FIG. 4*a* illustrates the DC intermediate link voltage $U_d$ versus time, and how this voltage is increased and decreased as a result of stepwisely changes of the DC supply voltage of the system. FIG. 4*b* is a graph of the power modification Pstab versus time requested for obtaining said stabilization. FIG. 4*c* is a graph of the motor torque T of the electric machine 1 versus time showing how the desired power modification is realized at the voltage decreases and at the first voltage increase by modifying the motor torque reference, whereas it is realized through the brake chopper at the second voltage increase as illustrated by FIG. 4*d* showing a graph of the actual brake chopper power $P_2$, i.e. said second power component, versus time.

The invention is of course in no way restricted to the embodiments described above, since many possibilities for modifications thereof are likely to be obvious to one skilled in the art without having to deviate from the scope of invention defined in the appended claims.

"Consumer of electric power" is to be interpreted as a member normally consuming electric power, but it is possible that such a member may also in some situations generate electric power, such as in the case of an electric machine on board a track-bound vehicle when braking the vehicle.

Said first and second power components may be positive or negative, which is also shown for the first power components added to the electric machine power control as shown in FIG. 4b upon a decrease of the DC intermediate link voltage.

The system may of course feed electric power to a plurality of first consumers, such as electric machines in a railway vehicle.

A said arrangement may be configured to sense any number of parameters, also only one.

The input filter may have any other appearance than the LC filter shown in FIG. 1.

"Sensing the speed" of the electric machine or vehicle shall not be interpreted as restricted to measuring the speed but also cover estimation thereof.

The invention claimed is:

1. A system for feeding electric power to a first consumer (1) of electric power, which system comprises:
   an input filter (6) with an input configured to be connected to a DC energy source,
   a DC intermediate link (3) connected to an output (14) of the input filter (6),
   a converter (12) with an input (13) connected to the DC intermediate link (3) and an output (15) configured to be connected to a first consumer (1) of electric power,
   a unit (16) configured to control the converter to obtain feeding of electric power requested by said first consumer (1) independently of variations of the voltage on the DC intermediate link (3), and
   an assembly configured to stabilize the voltage on the DC intermediate link upon a variation of this voltage,
   said assembly comprising said unit (16) configured to control the converter (12) to add a first power component to the power to be fed to said first consumer to obtain stabilization of the DC intermediate link voltage upon occurrence of a variation of this voltage,
   wherein the system comprises an arrangement (40-43) configured to sense at least one parameter associated with the system indicating whether the control unit (16) is able to obtain said stabilization by adding said first power component,
   the assembly further comprises a second consumer (19) of electric power connected in parallel with the converter (12) to the output (14) of the input filter (6), and
   a control member (20) of the system is configured to control said second consumer (19) to consume a second power component to one of a) assist the control of the converter (12) to obtain said stabilization and b) alone take care of this stabilization when the assembly is unable to obtain this alone by said first power component.

2. A system according to claim 1, wherein said second power consumer (19) comprises a series connection of a resistance (17) and a semiconductor switch (18) connected to the DC intermediate link (3) between said input filter (6) and the converter (12), and
   said control member (20) of the system is configured to control said second consumer to consume said second power component by controlling the semiconductor switch (18) to consume electric power by a current then flowing through the resistance (17).

3. A system according to claim 1, wherein said arrangement (40-43) is configured to sense the electric current flowing through said converter (12), and
   said control member (20) of the system is configured to control said second consumer (19) to consume said second power component to obtain said stabilization when the current sensed exceeds a predetermined value, making stabilization by said first power component, resulting in possible exceeding of a minimal margin remaining to a maximum current allowed for the converter.

4. A system according to claim 1, wherein said arrangement (40-43) is configured to sense whether said converter (12) is blocked or not, and
   said control member (20) of the system is configured to control said second consumer (19) to consume said second power component for obtaining said stabilization when the converter is blocked.

5. A system according to claim 1, configured to feed electric power to said first consumer in the form of an electric machine (1).

6. A system according to claim 5, wherein said arrangement (40) is configured to sense the torque generated by the electric machine, and
   said control member (20) of the system is configured to control said second consumer (19) to consume said second power component to obtain said stabilization when the torque sensed exceeds a predetermined value, making stabilization by said first component to resulting in possible exceeding of a minimal margin remaining to a maximum torque allowed for the electric machine.

7. A system according to claim 6, wherein said arrangement (40-43) is configured to sense the rotation speed of the electric machine (1), and
   said control member (20) of the system is configured to control said second consumer (19) to consume said second power component for obtaining said stabilization when the speed sensed is below a predetermined value.

8. A system according to claim 5, configured to feed electric power to said first consumer in the form of an electric machine (1) on board a track-bound vehicle (2), such as for propulsion of the vehicle or in an auxiliary power system of the vehicle.

9. A system according to claim 8, configured to feed electric power to an electric machine (1) on board a track-bound vehicle (2) for propulsion of the vehicle,
   said arrangement (40-43) is configured to sense a parameter indicating the slippery degree of tracks upon which said vehicle (2) is moving, and
   said control member (20) of the system is configured to control said second consumer (19) to consume a second power component to obtain said stabilization when slippery tracks demanding a slip slide control of the vehicle are sensed.

10. A system according to claim 8, wherein said second consumer is a brake chopper (19) controllable to consume electric power upon braking of the vehicle (2) without possibility to feed electric power back to said DC energy source.

11. A driving arrangement for a track-bound vehicle, comprising a system for feeding electric power to a first consumer (1) of electric power on board a track-bound vehicle (2) according to claim 1.

12. A track-bound vehicle having a system for feeding electric power to a first consumer (1) of electric power on board the vehicle (2) according to claim 1.

13. A method for feeding electric power to a first consumer (1) of electric power through a system comprising:
an input filter (6) with an input configured to be connected to a DC energy source,
a DC intermediate link (3) connected to an output (14) of the input filter (6),
a converter (12) with an input (13) connected to the DC intermediate link (3) and an output (15) configured to be connected to said first consumer (1) of electric power, and
a unit (16) configured to control the converter to obtain feeding of electric power requested by said first consumer independently of variations of the voltage on the DC intermediate link,
the method comprising a step of
a) carrying out a measure acting stabilizing on the voltage on the DC intermediate link (3) upon a variation of this voltage,
in which step a) comprises a substep of
a1) controlling the converter (12) to add a first power component to the power to be fed to said first consumer (1) to obtain stabilization of the DC link voltage upon occurrence of a variation of this voltage,
wherein the system comprises a second consumer (19) of electric power connected in parallel with the converter (12) to the output (14) of the input filter (6), and
the method comprises a step of
b) sensing at least one parameter associated with the system indicating whether the control unit (16) is able to obtain said stabilization by adding said first power component, and
a further substep to step a) of
a2) controlling said second consumer (19) to consume a second power component to one of 1) assist the control of the converter (12) to obtain said stabilization and 2) alone take care of this stabilization when this is not possible to obtain by solely adding said first power component when controlling the converter.

14. A method according to claim 13, wherein the electric current flowing through said converter (12) is sensed in step b), and
in step a2) said second consumer (19) is controlled to consume said second power component to obtain said stabilization when the current sensed exceeds a predetermined value, making stabilization by said first component resulting in possible exceeding of a minimal margin remaining to a maximum current allowed for the converter.

15. A method according to claim 13, wherein in step b) sensed whether said converter (12) is blocked or not, and
in step a2) said second consumer (19) is controlled to consume a second power component for obtaining said stabilization when the converter (12) is blocked.

16. A method according to claim 13, comprising feeding electric power to a first consumer (1) in the form of an electric machine (1).

17. A method according to claim 16, wherein the speed of the electric machine is sensed in step b), and
in step a2) said second consumer (19) is controlled to consume said second power component for obtaining said stabilization when the speed sensed is below a predetermined value.

18. A method according to claim 16, wherein the consumer (1) is in the form of an electric machine on board a track-bound vehicle (2).

19. A method according to claim 18, wherein electric power is fed to an electric machine (1) on board a track-bound vehicle (2) for propulsion of the vehicle,
a parameter indicating how slippery the tracks are upon which said vehicle (2) is moving is sensed in step b), and
in step a2) said second consumer (19) is controlled to consume a second power component to obtain said stabilization when slippery tracks demanding a slip slide control of the vehicle are sensed.

* * * * *